United States Patent
Venkatraman et al.

(10) Patent No.: US 10,194,272 B2
(45) Date of Patent: Jan. 29, 2019

(54) PEER DISCOVERY IN TRANSACTIONAL MOBILE APPLICATIONS

(71) Applicant: QUALCOMM Incorporated, San Diego, CA (US)

(72) Inventors: Sai Pradeep Venkatraman, Santa Clara, CA (US); Weihua Gao, San Jose, CA (US); Ju-Yong Do, Cupertino, CA (US); Meghna Agrawal, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/703,473

(22) Filed: Sep. 13, 2017

(65) Prior Publication Data
US 2018/0324548 A1 Nov. 8, 2018

Related U.S. Application Data

(60) Provisional application No. 62/500,478, filed on May 2, 2017.

(51) Int. Cl.
*H04W 4/02* (2018.01)
*G06K 9/62* (2006.01)
*H04W 76/14* (2018.01)

(52) U.S. Cl.
CPC .......... *H04W 4/023* (2013.01); *G06K 9/6202* (2013.01); *H04W 4/025* (2013.01); *H04W 76/14* (2018.02)

(58) Field of Classification Search
CPC ..... H04W 4/023; H04W 4/025; H04W 76/14; H04W 76/023; G06K 9/6202
(Continued)

(56) References Cited

U.S. PATENT DOCUMENTS

2010/0105409 A1 * 4/2010 Agarwal ............... G01S 5/0263
455/456.1
2011/0258313 A1 10/2011 Mallik et al.
(Continued)

FOREIGN PATENT DOCUMENTS

KR 20160057886 A 5/2016
WO WO-2014093255 A2 6/2014
(Continued)

OTHER PUBLICATIONS

International Search Report and Written Opinion—PCT/US2018/025649—ISA/EPO—dated Jul. 11, 2018.

*Primary Examiner* — William Nealon
(74) *Attorney, Agent, or Firm* — Thien T. Nguyen

(57) ABSTRACT

Embodiments of methods and apparatuses for peer discovery in transactional mobile applications are disclosed. In one embodiment, a method of peer discovery includes receiving from a server, at a first device, a meeting location and information for communication with a second device, obtaining a series of location data related to the second device, where the location data is based on a non-device-to-device positioning, determining whether to perform a direct device-to-device positioning with the second device using the meeting location and information for communication with the second device, performing a series of last-stretch direct device-to-device positioning measurements between the first device and the second device in response to a determination to perform the direct device-to-device positioning with the second device, and identifying the second device based on the series of last-stretch device-to-device positioning measurements between the first device and the second device.

28 Claims, 11 Drawing Sheets

(58) Field of Classification Search
USPC .................................................. 455/456.3
See application file for complete search history.

(56) References Cited

U.S. PATENT DOCUMENTS

| | | |
|---|---|---|
| 2012/0044089 A1 | 2/2012 | Yarnold et al. |
| 2013/0316727 A1* | 11/2013 | Edge .................. H04W 4/02 455/456.1 |
| 2014/0213306 A1* | 7/2014 | Blankenship ........... H04W 4/21 455/457 |
| 2014/0248901 A1* | 9/2014 | Johnsson .............. H04W 64/00 455/456.1 |
| 2015/0208226 A1 | 7/2015 | Kuusilinna et al. |

FOREIGN PATENT DOCUMENTS

| | | |
|---|---|---|
| WO | WO-2014210250 A1 | 12/2014 |
| WO | WO-2017023483 A1 | 2/2017 |

\* cited by examiner

522

Determine a threshold range between the first device and the second device based on the communication capabilities of the first device and the second device, where the determination to perform the direct device-to-device positioning with the second device is based on the determined threshold range

Pair the first device and the second device based on interoperability of communication capabilities of the first device and the second device

FIG. 5C

PEER DISCOVERY IN TRANSACTIONAL MOBILE APPLICATIONS

CROSS-REFERENCE TO RELATED APPLICATIONS

This application claims the benefit of U.S. provisional patent application No. 62/500,478, "Peer Discovery in Transactional Mobile Applications" filed May 2, 2017, which is assigned to the assignee hereof. The aforementioned United States patent application is hereby incorporated by reference in its entirety.

FIELD

The present disclosure relates to the field of mobile communications. In particular, the present disclosure relates to apparatuses and methods for peer discovery in transactional mobile applications.

BACKGROUND

Applications such as Uber and Lyft depend on location estimates on mobile devices. Passengers awaiting their ride can monitor the progress of their drivers on a map. Passengers provide their pickup locations when requesting their rides.

However, in crowded cities, a passenger pickup location by itself has proved to be insufficient in many cases. For example, there are several documented cases of mistaken identities with passengers getting into the wrong cars or drivers approaching the wrong groups for pickup. Such inaccurate or imprecise pickup location estimates can lead to situations where the drivers and passengers engage in a series of calls or texts to resolve the misidentifications. Such issues may be even more challenging to resolve in situations when there are difficulties in reading license plates at night, when a self-driving taxis being the pickup vehicle, or when a robot being the delivery vehicle. Therefore, it would be beneficial to use apparatuses and methods for peer discovery in transactional mobile applications.

SUMMARY

Embodiments of apparatuses and methods for peer discovery in transactional mobile applications. In one embodiment, a method of peer discovery includes receiving from a server, at a first device, a meeting location and information for communication with a second device, obtaining a series of location data related to the second device, where the location data is based on a non-device-to-device positioning, determining whether to perform a direct device-to-device positioning with the second device using the meeting location and information for communication with the second device, performing a series of last-stretch direct device-to-device positioning measurements between the first device and second device in response to a determination to perform the direct device-to-device positioning with the second device, and identifying the second device based on the series of last-stretch device-to-device positioning measurements between the first device and the second device.

In another embodiment, a device may include a transceiver, a memory and a controller coupled to the transceiver and the memory. The transceiver is configured to receive, from a server, a meeting location and information for communication with a second device, and obtain a series of location data related to the second device, where the location data is based on a non-device-to-device positioning. The memory configured to store the meeting location, the information for communication with the second device, and the series of location data related to the second device. The controller is configured to determine whether to perform a direct device-to-device positioning with the second device using the meeting location and information for communication with the second device, compute a series of last-stretch direct device-to-device ranges based on a series of last-stretch direct device-to-device positioning measurements between the device and the second device computed in response to a determination to perform the direct device-to-device positioning with the second device, and identify the second device based on the series of last-stretch device-to-device positioning ranges between the device and the second device. According to aspects of the present disclosure, the information for communication between the device and the second device comprises at least one of: a pseudo address of the second device assigned by the server, communication capabilities of the second device, a description associated with the second device, an authentication token assigned by the server, or some combinations thereof.

The controller is further configured to compute the series of last-stretch device-to-device ranges between the device and second device comprises the controller configured to compute the series of last-stretch device-to-device ranges based on the pseudo address of the second device assigned by the server, the communication capabilities of the second device, and the authentication token. The communication capabilities of the device and the second device comprises at least one of: LTE direct communication, WiFi direct communication, Bluetooth peer-to-peer communication, or some combinations thereof.

The controller is further configured to determine a threshold range between the device and the second device based on the communication capabilities of the device and the second device, where the determination to perform the direct device-to-device positioning with the second device is based on the determined threshold range. The device and the second device are paired based on interoperability of communication capabilities of the device and the second device.

In some implementations, the controller is further configured to determine a route between the device and the second device based on the meeting location and map information. In addition, the controller is further configured to perform at least one of: direct device-to-device positioning with the second device in response to the device reaching a point on a route that is within a threshold range of the second device, direct device-to-device positioning with the second device in response to the second device being in a line of sight of the device, or some combinations thereof.

In some implementations, the controller is further configured to update the meeting location prior to identifying the second device, where the updated meeting location is proposed by either the first device or the second device, and update the series of last-stretch positioning measurements between the device and the second device according to the updated meeting location. In addition, the controller is further configured to identify the second device based on the series of last-stretch positioning ranges approaching zero, where the series of last-stretch direct device-to-device ranges is based on the last-stretch direct device-to-device positioning measurements.

In some other implementations, the controller is further configured to obtain images of surroundings in view of the device, determine a match of the images to a description associated with the second device; and identify the second device based on the match of the images to the description associated with the second device.

In yet another embodiment, a non-transitory medium storing instructions for execution by one or more processors of a device. The instructions comprise instructions for processing from a server, at the device, a received meeting location and information for communication with a second device, instructions for processing a series of received location data related to the second device, where the location data is based on a non-device-to-device positioning, instructions for determining whether to perform a direct device-to-device positioning with the second device using the meeting location and information for communication with the second device, instructions for performing a series of last-stretch direct device-to-device positioning measurements between the device and the second device in response to a determination to perform the direct device-to-device positioning with the second device, and instructions for identifying the second device based on the series of last-stretch device-to-device positioning measurements between the first device and the second device.

The instructions for performing the series of last-stretch positioning measurements between the device and second device comprises instructions for performing the series of last-stretch positioning measurements between the first device and second device based on the pseudo address of the second device assigned by the server, the communication capabilities of the second device, and the authentication token.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIG. 5B illustrates an exemplary implementation of determining a threshold range between two mobile devices according to aspects of the present disclosure.

FIG. 5C illustrates an exemplary implementation of pairing two mobile devices for peer discovery according to aspects of the present disclosure.

DESCRIPTION OF EMBODIMENTS

Figure 1:
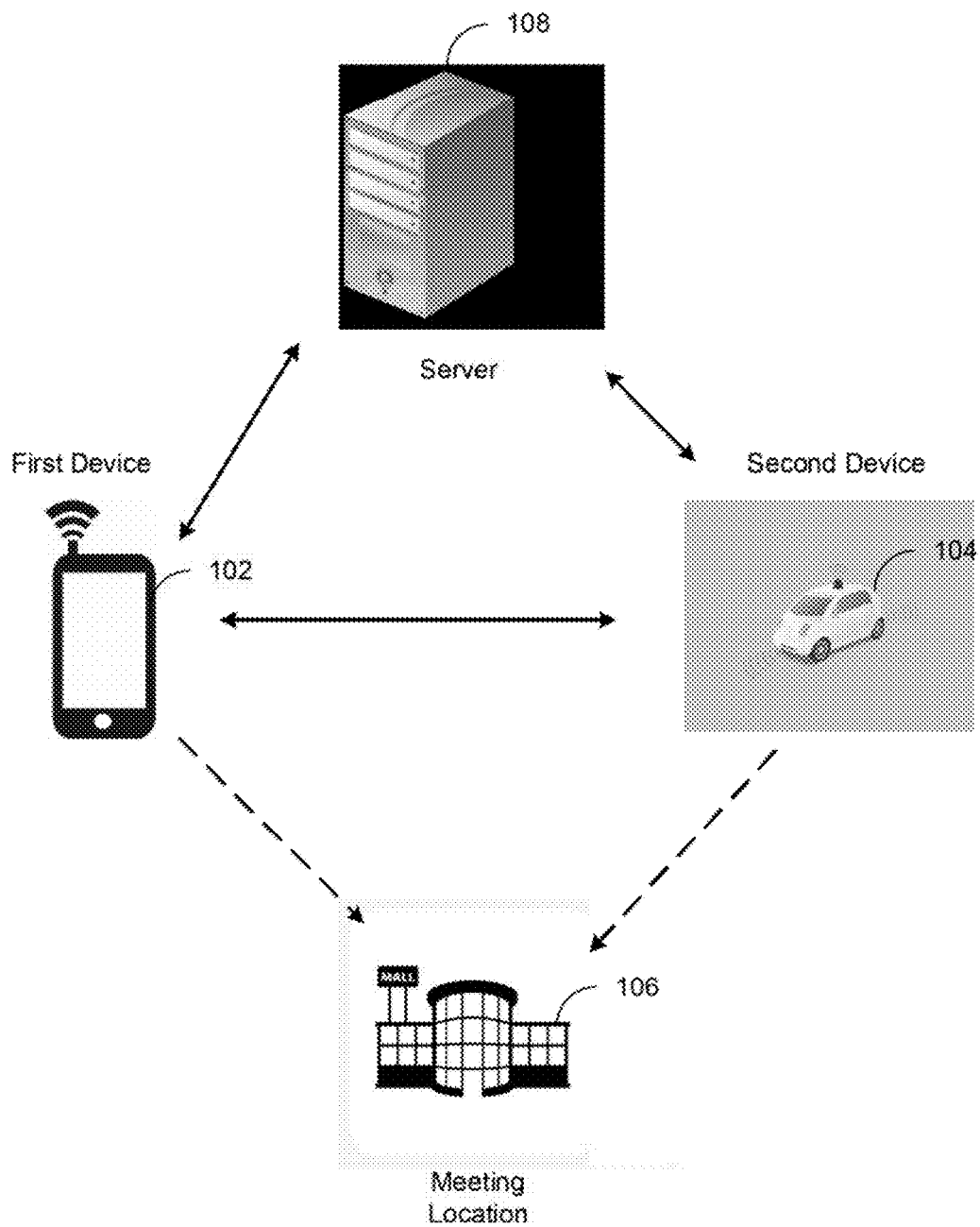
FIG. 1 illustrates an exemplary environment of peer discovery in a transactional mobile application according to aspects of the present disclosure.

Embodiments of apparatuses and methods for peer discovery in transactional mobile applications are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

According to aspects of the present disclosure, the terms device, mobile device, wireless device, terminal, mobile terminal and user equipment (UE) may be used interchangeably without altering the scope of the disclosure. For instance, a device to device communication may refer to communication between two UEs. A device or UE refers to a mobile station such as a cellular or other wireless communication device, personal communication system (PCS) device, personal navigation device, Personal Information Manager (PIM), Personal Digital Assistant (PDA), laptop, tablet, tracking device or other suitable mobile device which is capable of receiving wireless communications. The term "device" or "UE" is also intended to include devices which communicate with a personal navigation device (PND), such as by short-range wireless, infrared, wire line connection, or other connection-regardless of whether satellite signal reception, assistance data reception, and/or position-related processing occur at the device or at the PND. Also, a "device" or "UE" may include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered as a "device" or "UE".

Various communication technologies may enable communication over a wide area between devices relying on a sophisticated network to facilitate the communication. With the increasing use of user equipment end-point devices such as cell phones, tablets, smart phones, laptops, etc. and the exclusive reliance on the network for communication there is mounting pressure on the network for servicing the devices. Communication between devices may then be hampered or restricted in situations where one of the devices is out of the coverage range of the network or when network resources (e.g. supporting signaling and/or processing) are congested by the demands of multiple devices. Direct peer to peer communication between devices may then be of benefit to the devices, their associated applications and users and to networks. Such direct peer to peer communication may be implemented when devices are nearby to one another (e.g. within 500 meters of each other in some scenarios). Certain applications and services, in addition to direct peer to peer communication, may also depend on or be related to devices being nearby to one another—e.g. a service that alerts users when in proximity to certain other users (e.g. friends, colleagues or relatives) or points of interest (e.g. certain shops). There may thus be a benefit to supporting and enhancing a determination that devices are in proximity to one another and to supporting direct communication between devices that are in proximity.

Direct Device to Device (D2D) communication may bypass use of a network where the devices are in communicable proximity to one another. In one exemplary implementation, the distance threshold for communicable proximity may be configurable based on environmental factors such as rain, signal fading, line of sight, etc. For instance, the distance threshold may be configurable from 200 to 1000 meters apart. In other implementations, the distance threshold for D2D communication may be fixed over a period of time based on a conservative estimate of distance for reliable D2D communication. In yet another implementation, the distance threshold may be directly based on the signal quality between the two devices. A D2D mode may support signaling and/or data transfer directly between nearby devices, for example without the aid of a network such as a Radio Access Network (RAN)). D2D communication may be point to point or multipoint, for example broadcasting from one device to other devices. In some embodiments, a public land mobile network (PLMN), such as a visited PLMN (VPLMN) or a home PLMN (HPLMN), may coordinate D2D communication, for example by helping establish communication links, controlling use of D2D mode versus network mode, and/or providing security support.

In some embodiments, knowledge of the level of proximity between devices may be useful to certain proximity services and associated applications. For example, a service supported by certain applications that informs an associated user when a certain friend, colleague or relative is nearby or when some point of interest (e.g. a certain shop, restaurant, fast food kiosk or empty parking space) is near to the user may depend on determining some threshold of proximity similar to or the same as that employed to determine an ability to engage in D2D communication. Determining proximity to support both proximity services and D2D communication may therefore be useful in certain scenarios.

Knowledge of the relative locations of devices that either are already in D2D mode or are not yet in D2D mode but are capable of using D2D mode may be useful. For example, devices not yet in D2D mode may be configured to listen for one another when the distance(s) between them falls below some reference threshold. Similarly, devices already using D2D mode can be configured to search for nearby network base stations or access points in preparation for performing a handover back to network mode when the distance(s) between the devices exceeds some threshold. Knowledge of the relative locations of two or more devices may be further useful to determine when two or more devices are in proximity to one another in order to support proximity services other than D2D communication as described herein above.

FIG. 1 illustrates an exemplary environment of peer discovery in a transactional mobile application according to aspects of the present disclosure. In the exemplary environment shown in FIG. 1, a communication between a first device 102 and a second device 104 regarding a meeting location 106 may be established through a server 108. Each of the first device 102 or the second device 104 may employ a different communication mechanism or a different communication network for its communication with the server 108.

According to aspects of the present disclosure, one exemplary implementation may be for the ride-sharing application server to assign a token or identifier for the ride that can be broadcast by the mobile devices and can only be deciphered only by the driver and passenger. This approach can be used for discovery and authentication among the parties. In addition, this approach may also be used to mask individual identities. For example, network could assign temporary identifiers for each device that can prevent one device from learning identifying information associated with the other device.

Communication service between mobile devices can be selected from a group comprising a Long-Term Evolution (LTE) Direct service, a WiFi Direct service, and a Peer-to-Peer (P2P) service, or some combinations thereof.

Request/response scheme may be implemented in such a manner that one of the mobile devices transmits the discovery request and receives a response from the other mobile device when it is capable of receiving and deciphering the messages. Mobile devices can further exchange parameters pertaining to ranging or angle of arrival (AoA) operations where appropriate over the established channel. Round-trip time (RTT)/ranging/AoA between the driver and passenger mobile devices can then be used in combination with pickup location to provide an improved the location estimate. Note that in case of a carpool service that can pick up more than one passenger from the same location at the same time, multiple measurements between driver and each passenger device may be combined to improve the estimate. In some embodiments, the relative range measurements between driver and passenger may be compared to the difference in location estimates obtained from the devices, which may then be used to determine if one of the location estimates is incorrect.

Existing location methods for mobile wireless devices like Global Navigation Satellite System (GNSS), Assisted GNSS (A-GNSS), Observed Time Difference of Arrival (OTDOA), Advanced Forward Link Trilateration (AFLT), Enhanced Cell ID (E-CID) to name just a few, have been developed for locating individual devices by organizations such as the consortia named 3rd Generation Partnership Project (3GPP) and 3rd Generation Partnership Project 2 (3GPP2). These location methods may be (i) battery intensive, (ii) dependent on availability of particular network support (e.g. assistance data from a network location server and/or an ability to receive radio signals from several network base stations or access points whose locations are accurately known), and/or (iii) unreliable in certain environments (e.g. indoors) and/or in certain scenarios (e.g. in an accident or disaster situation where network coverage is mostly or completely absent). Location methods applicable to a pair or group of devices for obtaining relative locations and/or distances between devices may be more appropriate for D2D use and may avoid some of the limitations of existing methods.

As described herein, D2D mode may refer to a mode of operation of a mobile device where direct peer to peer communication between two or more devices (i.e. not via a network) occurs. The network mode may refer to communication between two or more devices via the network (e.g. via a serving network). An autonomous operation may refer to an operation where two or more devices establish D2D communications autonomously (with little or no network control or assistance). A network assisted operation may refer to an operation where the network (e.g. a serving network) assists two or more devices to enter D2D mode and where network mode may or may not be possible. A network based operation may refer to an operation where the network (e.g. a serving network) controls entry to D2D mode, supports network mode and supports handover between D2D mode and network mode. A D2D group may refer to a group of two or more devices using D2D mode to communicate with each other. A D2D pair may refer to a group of two devices engaged in D2D mode for communication with each other. A D2D relay may refer to a device R that acts as a relay to support D2D mode between other devices—for example, by relaying communication between one device A and another device B in a scenario when devices A and B are unable to use D2D communication directly but are in D2D communication with the relay R.

D2D mode may support signaling and data transfer directly between nearby devices. D2D communication may be point to point or multipoint (e.g. broadcast, multicast or narrowcast from one device to other devices). A network, such as a PLMN may coordinate the D2D communication. For example, in a PLMN, such as a Global System for Mobile Communications (GSM) network, either the HPLMN or VPLMN may help establish communication links, control use of D2D mode versus network mode, and/or provide security support.

Figure 2:
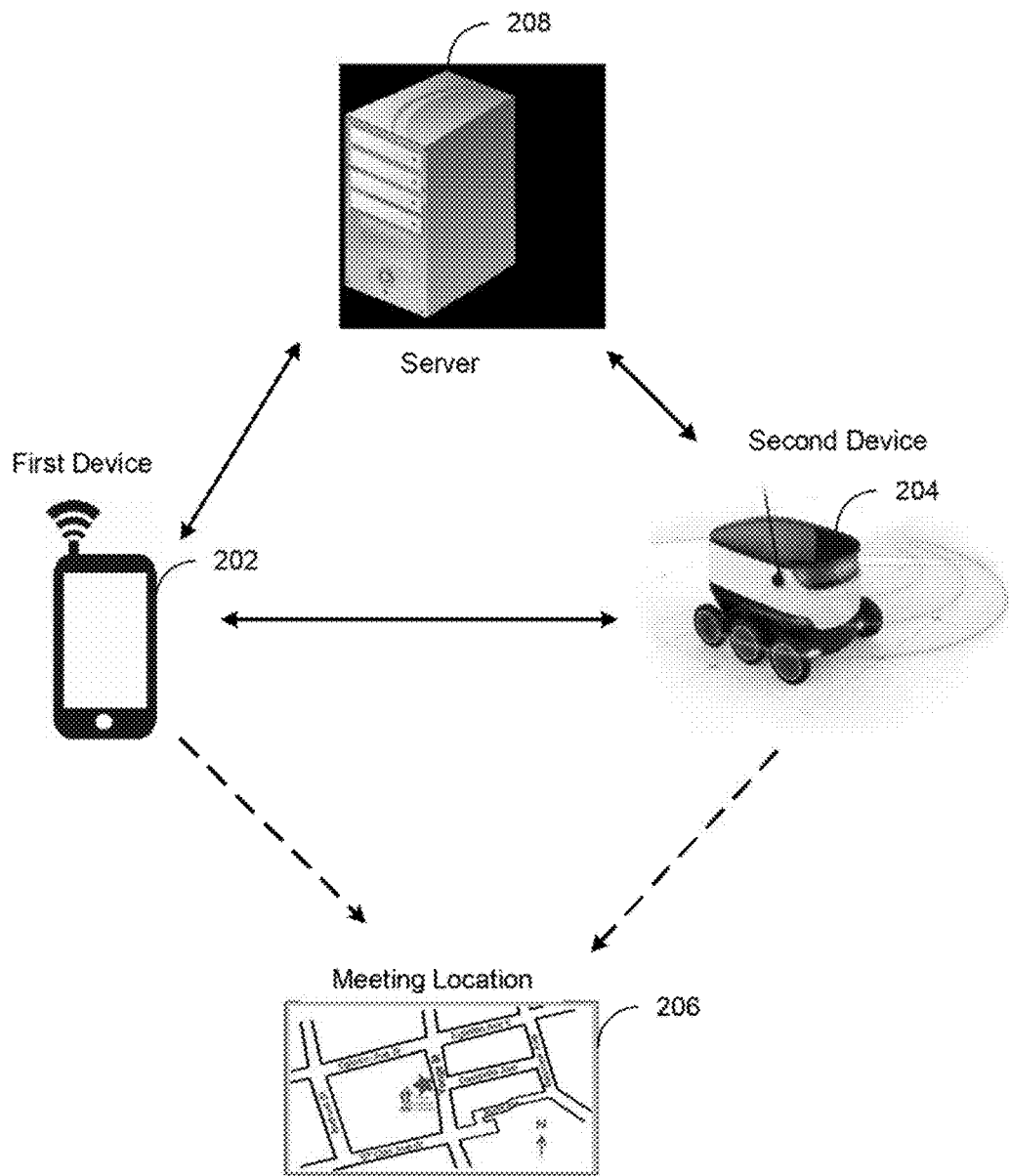
FIG. 2 illustrates another exemplary environment of peer discovery in a transactional mobile application according to aspects of the present disclosure.

FIG. 2 illustrates another exemplary environment of peer discovery in a transactional mobile application according to aspects of the present disclosure. As shown in FIG. 2, similar to the exemplary environment shown in FIG. 1, a communication between a first device 202 and a second device 204 regarding a meeting location 206 may be established through a server 208. Each of the first device 202 or the second device 204 may employ a different communication mechanism or a different communication network for its communication with the server 208. In this example, the second device 204 may be a robot or drone that may be configured to deliver a merchandise to a user of the first device 202.

According to aspects of the present disclosure, in some embodiments, the uncertainty estimate from the passenger and driver UE location estimates may be combined with the uncertainty estimate of the range/angle of arrival (AoA) to obtain a new estimate of the passenger UE. In non-line-of-sight (NLOS) conditions, if uncertainty in range or AoA exceeds certain thresholds, it may be determined that a combined estimation would not be used. In some implementations, a maximum number of ranging/AoA attempts maybe specified to optimize battery usage. In some embodiments, two way ranging/AoA measurements and communications may be employed to collaboratively determine a better relative position estimate.

According to aspects of the present disclosure, location of UEs may be relative or absolute. With absolute locations, the absolute location coordinates of each UE are obtained. This may be enabled by position methods such as A-GNSS. OTDOA and AFLT. With relative location, distances between pairs of UEs may be obtained, leading to a known location structure for a D2D group in which the location of each UE is known relative to other UEs in the group but where the absolute location and orientation of the group of UEs may not be known.

In exemplary implementations, using D2D mode for communication may be advantageous in reducing network load. A group of communicating UEs that happen to be nearby to one another may then be placed in D2D mode by the network when close enough to one another and removed from this mode if their separation increases enough. Note that, two UEs may be in D2D mode, even though they may belong to different cells, since they happen to be near enough to one another to communicate directly with each other, according to aspects of the present disclosure. UE locations as well as serving cell IDs may then be used to help determine when D2D mode might be available again. For example, if two UEs share the same serving cell or have serving cells that are adjacent or partially or completely overlapping, then for small enough serving cell areas, the UEs may be considered close enough together to attempt using D2D communication. For IP Multimedia Subsystems (IMS) communication, the media paths between two UEs may use D2D mode, while continuing to use a signaling path for IMS communication via the network.

Relative UE locations may be used with network based and network assisted operations to help trigger D2D mode (e.g. distance between 2 UEs). Relative UE locations may also be used to determine whether two UEs are in proximity to support other types of proximity service. In one implementation, serving cell IDs can be used instead as an approximation. For example, D2D mode (or determination of proximity for some other proximity service) may be possible for 2 UEs with the same serving cell or with adjacent serving cells if the cell serving areas are small (e.g. 1 kilometer across or less). Also, in some implementations, Enhanced Cell ID (E-CID) positioning may have enough resolution to determine UE location rather than A-GNSS or observed time difference of arrival (OTDOA) to reduce positioning delay and resources. Periodic monitoring of relative locations as well as signal strength/quality of the D2D communication link can be used to trigger handoff from D2D mode back to network mode.

Embodiments of the present disclosure may also be used for autonomous D2D operations. In autonomous operation, initial discovery and establishment of D2D communication may be based on ability to transfer signals directly between UEs. Alternatively, for UEs attached to a network that does not support D2D mode, but where D2D mode is permitted, UEs may connect via the network and exchange serving cell and location information to determine the possibility of D2D mode. Once D2D mode is in progress, UEs may monitor their relative locations and for a group of UEs, assign and reassign the role of being a relay based on the relative locations.

In some implementations, a VPLMN may be expected to coordinate and manage D2D communication—e.g. to allow and enable certain UEs to engage in D2D communication. However, in some situations D2D communication may need to occur autonomously with little or no network support. For example, autonomous D2D communication may be useful (i) in a disaster situation to support communication between first responders (and victims), (ii) for an emergency call when a calling UE cannot access a network but can access another UE, (iii) when a pair or group of UEs wish to communicate out of coverage of any potential serving network, and/or (iv) when a serving network or part of a network is heavily congested and nearby users within its coverage area wish to communicate (e.g. spectators at a sports stadium).

To enable autonomous D2D communication, embodiments of the present disclosure may perform verification of no accessible serving network or serving network permission for autonomous operation, discovery of nearby D2D capable UEs, verification of a willingness or intent to communicate, negotiation and establishment of D2D communication.

In some implementations, discovery of either nearby D2D capable UEs willing to communicate or other UEs supporting other common proximity services may include a UE broadcasting an identification signal continuously or periodically, where any periodicity of broadcast may be configured or defined (point to point or via broadcast) by the serving network if accessible. The UE broadcast signal may include some small subset of information broadcast by a base station or femtocell or may be based on a WiFi Beacon channel. Broadcast information may include communication characteristics (e.g. frequencies), D2D capabilities, and proximity services requested (e.g. emergency, selective non-emergency). Information can also include a temporary UE pseudo ID and a list of one or more proximity service IDs. A proximity service ID may be an ID hardcoded or configured in a UE or entered by a user that identifies either (i) a willingness by the UE to establish a D2D group or D2D pair with other nearby UEs associated with the same service ID or (ii) an interest in supporting some other proximity service that may not require D2D communication such as notification of a nearby friend, colleague, relative or point of interest.

Negotiation and establishment of D2D communication, when this is requested, or determination that two UEs share a common proximity service may include a subject UE receiving a broadcast from another UE containing a supported service ID, after which the subject UE may respond with direct communication, for example, by first establishing a signaling link. Furthermore, mutual authentication between the 2 UEs may occur in two steps. In the first step, a challenge/response message exchange may occur in each direction based on a shared secret key reserved or configured in the UE or entered by the user. In the second step, a client side certificate associated with a UE public user identity (e.g. a Mobile Subscriber Integrated Services Digital Network-Number (MSISDN)) or user name may be sent by either UE to the other UE to authenticate the sending UE.

Figure 3:
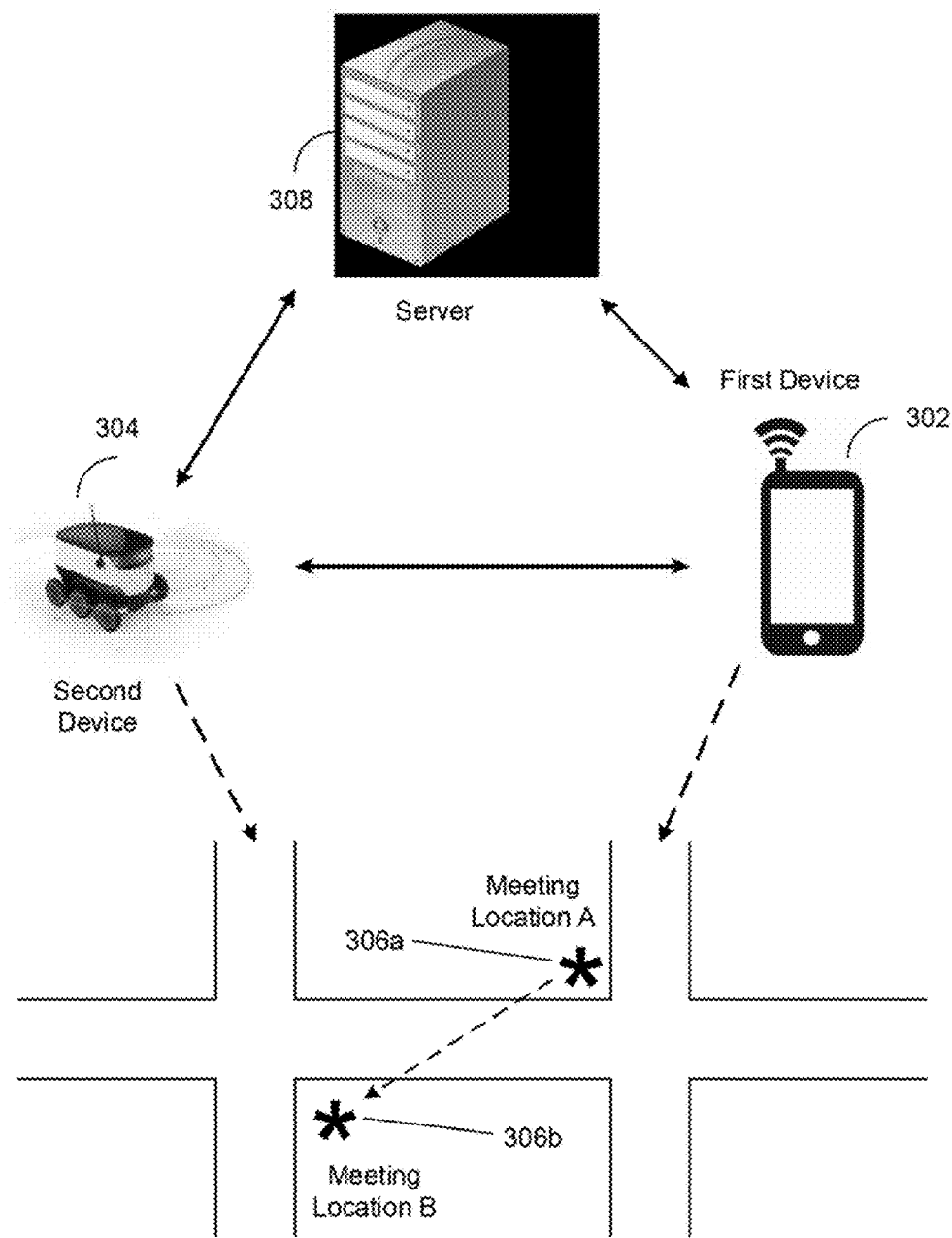
FIG. 3 illustrates an exemplary application of peer discovery in a transactional mobile application according to aspects of the present disclosure.

FIG. 3 illustrates an exemplary application of peer discovery in a transactional mobile application according to aspects of the present disclosure. As shown in FIG. 3, similar to the example shown in FIG. 2, a communication between a first device 302 and a second device 304 regarding an initial meeting location A 306a may be established through a server 308. In this example, the second device 304 may be a robot or drone that may be configured to deliver a merchandise to a user of the first device 302. On the way of travelling to the initial meeting location A 306a or when one of the devices gets close to the initial meeting location, either or both of the devices may discover that the initial meeting location A 306a may not be a feasible meeting location any longer, for example the street may be blocked for a local event. Or either or both of the devices may discover that the initial meeting location A 306a may not be the best meeting location, for example if the initial meeting location A 306a may be on a one way street and it may take a longer time for one of the devices to reach this location. According to aspects of the present disclosure, an updated meeting location 306b may be proposed by either the first device 302 or by the second device 304. This updated meeting location 306b may be communicated to each of the device through the server 308 or may be communicated directly between the first device 302 and the second device 304 through a direct device-to-device communication mechanism.

According to aspects of the present disclosure, two devices may communicate with one another via one or more networks, which is referred to here as network mode. Device to Device (D2D) communication, referred to here also as D2D mode, may bypass use of a network where the devices are in communicable proximity to one another. Knowledge of the relative locations of devices that either are already in D2D mode or are not yet in D2D mode but are capable of using D2D mode may be useful. For example, devices not yet in D2D mode may be configured to listen for one another when the distance(s) between them falls below some threshold. Similarly, devices already using D2D mode can be configured to search for nearby network base stations or access points in preparation for performing a handover back to network mode when the distance(s) between them exceeds some threshold. Knowledge of the relative locations of two or more devices may be further useful to determine when the devices are in proximity to one another in order to support other services and applications (besides D2D communication) that depend on or assume such proximity Examples of such proximity services may include notification of a user of a mobile device when in proximity to either certain other users (e.g. friends, colleagues, relatives) or certain points of interest (e.g. a certain shop or restaurant). It should be noted that D2D communication itself, depending as it does on devices being in proximity to one another, can be seen as one particular type of proximity service. Therefore, in a general sense, the ability to locate devices and determine the extent of their proximity can be seen as potentially beneficial to all proximity services.

Existing methods to locate a mobile device, such as A-GNSS, for example, have typically been developed for obtaining an absolute location (e.g. latitude and longitude coordinates) and may be battery intensive, dependent on availability of particular network support and/or unreliable in certain environments (e.g. indoors). Location methods applicable to a pair or group of devices for obtaining relative locations and/or distances between devices may be more appropriate under certain conditions (e.g. in an indoor environment) to determine proximity conditions for D2D communication and/or to support particular proximity services and may avoid some of the limitations of existing methods. As described above, application server to assign a token or identifier may be assigned to the D2D devices and can only be deciphered only by the D2D devices. The assigned token or identifier can be used for discovery and authentication among the parties. In addition, the assigned token or identifier may also be used to mask individual identities. For example, network could assign temporary identifiers for each device such that it prevents one device from learning identifying information associated with the other device.

An exemplary method for determining a distance between a first device and a second device may include determining a first time of arrival for a first signal from a first base station sent to the second device via the first device, determining a second time of arrival for a second signal sent directly from a second base station to the second device, and determining the distance between the first device and the second device using the first and the second times of arrivals. In one aspect, the messaging protocol used for sending and receiving signals is one of LTE Positioning Protocol (LPP), LPP Extensions (LPPe) and Radio Resource Control (RRC) protocol.

In some implementations of the exemplary method, the method further includes determining that the distance between the first device and the second device is lower than or higher than a threshold, and enabling or disabling, respectively, communication between the first device and the second device using a device-to-device mode, where the device-to-device mode comprises the first device and the second device communicating with each other without sending data through the first base station or the second base station. Note that in D2D communication between two WiFi devices, Fine Timing Measurements (FTMs) may be used for ranging measurements. In other implementations of the method, the method further includes determining that the distance between the first device and the second device is lower than a threshold, and informing each of the first device and second device of being in proximity to the other device for one or more proximity services of interest to each of the first device and second device.

An exemplary device for determining a distance between a first device and a second device, where the exemplary device may be a first device or a second device, may include, a processor for determining a first time of arrival for a first signal from a first base station sent to the second device via the first device, determining a second time of arrival for a second signal sent directly from a second base station to the second device, and determining the distance between the first device and the second device using the first and the second times of arrivals. In one aspect, the messaging protocol used for sending and receiving signals is one of LPP, LPP Extensions (LPPe) and Radio Resource Control (RRC) protocol.

In some implementations of the exemplary device, the processor is further configured for determining that the distance between the first device and the second device is lower than or higher than a threshold, and enabling or disabling, respectively, communication between the first device and the second device using a device-to-device mode, where the device-to-device mode comprises the first device and the second device communicating with each other without sending data through the first base station or the second base station. In other implementations of the device, the processor is further configured for determining that the distance between the first device and the second device is lower than a threshold, and informing each of the first device and second device of being in proximity to the other device for one or more proximity services of interest to each of the first device and second device.

In some exemplary embodiments, the first base station serves the first device. In one aspect, the first base station and the second base station are the same base station, the same base station serves the first and the second devices, and the same base station aligns timing of the first device and the second device to a common serving base station time. In another aspect, determining the distance between the first device and the second device, by the processor, comprises obtaining a difference between the first and second times of arrival.

An exemplary non-transitory computer readable storage medium, where the non-transitory computer readable storage medium stores and/or comprises instructions executable by a processor, the instructions comprising instructions for determining a distance between a first device and a second device may include, determining a first time of arrival for a first signal from a first base station sent to the second device via the first device, determining a second time of arrival for a second signal sent directly from a second base station to the second device, and determining the distance between the first device and the second device using the first and the second times of arrivals. In one aspect, the messaging protocol used for sending and receiving signals is one of LPP, LPP Extensions (LPPe) and Radio Resource Control (RRC) protocol.

Figure 4A:
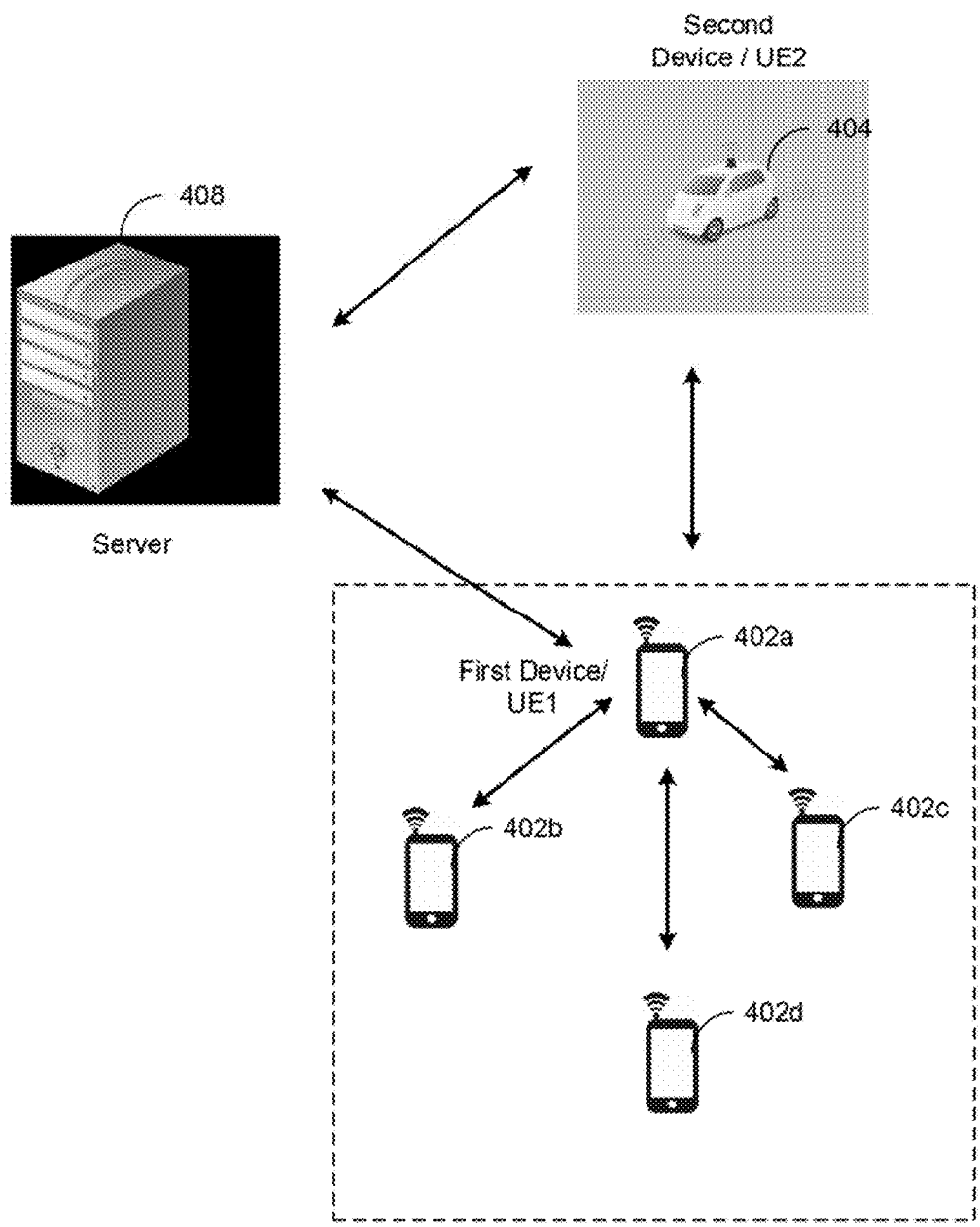
FIG. 4A illustrates an exemplary implementation of a D2D group according to aspects of the present disclosure.

FIG. 4A illustrates an exemplary implementation of a D2D group according to aspects of the present disclosure. As shown in FIG. 4A, a communication between a first device/UE1 402a and a second device/UE2 404 may be established through a server 408. Each of the first device/UE1 402a and a second device/UE2 404 may employ a different communication mechanism or a different communication network for its communication with the server 408.

In some implementations, UE 1 402a may represent a group of UEs, such as UEs 402b, 402c and 402d that may seek the benefit of the transaction between UE 1 402a and UE 2 404. UE 1 402a may be within a communication cell and communicatively connected to a base station (not shown). UEs 402b, 402c and 402d may or may not be in communicable range of a base station or any other base stations. In other scenarios, even if the UEs 402b, 402c and 402d were in communicable range of a base station, they may still not be serviced by the base station due to contractual restrictions, differences in communication protocols used by the UE and the base station or any other reason.

As shown in FIG. 4A, UEs 402a, 402b. 402c and 402d are within communicable range of each other and may form a D2D communication group using a group ID. The group members may authenticate each other or the group before joining the group as described above. In an emergency situation, UE 402b although not directly connected to any base transceiver station or the internet may be able to send an emergency message, using an emergency service type, through other group members acting as relay UEs, such as UE 1 402a through a base station. For example, UEs 402a, 402b, 402c and 402d may be members of a family or may be a group of friends. In this case, UE 402a may be chosen by the group of friends to act as the main contact person in the D2D communications with the device UE2 404. UE 402a may then relay information about its communications with UE2 404, such as the location and expected arrival time of UE2 404, to UEs 402b, 402c, and 402d. Furthermore, in normal operation, UEs 402a, 402b, 402c and 402d may also communicate directly with each other for the purpose of enabling voice communication between their respective users or sharing data, such as music and videos without loading the network. This relieves the network of the additional bandwidth needs and also has the potential of saving the user of each UE costs for transferring voice and data traffic using the network.

Devices engaged in D2D communication may be organized in groups. A D2D group may comprise a pair of UEs communicating voice, video, text and/or data. A D2D group may also be part of a peer to peer (P2P) group supporting broadcast by one UE to some or all other UEs in the P2P group. A D2D group may provide efficient means of supporting P2P communication, for example because network load may be reduced. Distributed algorithms running at the P2P application level may control the sending and receiving functions, e.g., decide which UE is allowed to transmit voice/video/text to other UEs at any time. Allocation and reallocation of transmission capability from the network to different D2D groups may, however, be a complex issue due to dynamic interference conditions.

Service IDs (or proximity service IDs) may be used to manage communication in D2D mode and help support other proximity services. A service ID may consist of a service type and a group ID. In one implementation, the service type may be a one level value or a structured set of values. For example, a first level may indicate a broad category of services such as relating to an emergency, advertising, or friend/family, and a second level may indicate a preferred type of communication such as a voice call, voice/video call, or text/IM. The group ID may indicate a specific set of UEs (e.g., UEs belonging to a group of friends, relatives or employees of the same company) or may be open to any UE. Broadcast of a service ID by a UE may signify either a willingness to engage in D2D communication with other nearby UEs who support the same service ID or an interest in supporting some other specific proximity service. Service IDs may be configured in the UE (e.g., by the user, home operator, or an application resident on the UE).

Some group IDs may be reserved group IDs for services such as emergency services and may be globally or nationally unique. Operator configured group IDs may include the international operator mobile country code (MCC) and/or mobile network code (MNC) to ensure global uniqueness. Application assigned group IDs may be unique, for example if they include an associated operator MCC-MNC code, a unique operating system (OS) code, and/or a unique vendor code. User assigned group IDs may not be unique (e.g., if based on a shared name and/or user assigned number). However, the authentication process may normally filter out invalid communication between members of different groups that use the same group ID.

In some implementations, the group IDs may be subjected to authentication. To authenticate user or device membership of a group ID, a separate shared secret key can be entered or configured by the user, home operator or application for a particular group. Authentication based on a client side certificate associated with (i) the user name, (ii) a public user identity such as an MSISDN or International Mobile Subscriber Identity (IMSI), and/or (iii) a mobile device identity such as an International Mobile Equipment Identity (IMEI) may also be used. In one embodiment, a procedure to initially establish a D2D connection or verify that two UEs, UE 1 and UE 2, support the same proximity service may include UE 1 broadcasting a Service ID containing a group ID A and a random value V1 linked to a shared secret key K belonging to the D2D group A (not shown), and UE 2 responding with a value V2 based on V1 and K, a random value V3 and a time difference D2 indicative of a signal propagation delay between UEs 1 and 2 (e.g. the time difference $Tx_2-Rx_1$ described in association with FIG. 4B). Part or all of the response from UE 2 may be ciphered based on K and V1. UE 1 may use V2 (and the ciphering) to initially authenticate UE 2's membership in the group A, measure a time difference D1 indicative of a signal propagation delay between UEs 1 and 2 (e.g. the time difference $Tx_1-Rx_2$ described in association with FIG. 4B later herein), compute the Round Trip signal propagation Time (RTT) between UE 1 and UE 2 using D1 and D2 (e.g. compute the RTT as D1+D2 as described later for FIG. 4B), and respond to UE 2 using D2D mode with the time difference D1 and a value V4 based on V3 and K. UE 2 may use V4 to initially authenticate UE 1's membership in the group A and obtain the RTT as for UE 1 (e.g. as the sum of D1 and D2). Authentication of each UE by the other UE using certificates may then proceed if preferred—for example, a Transport Layer Security (TLS) session over TCP/IP may be established using D2D mode to carry all UE 1 to UE 2 communication where the authentication using UE certificates occurs as part of establishing the TLS session.

According to aspects of the present disclosure, to support D2D communication and other proximity services, a UE may measure signals from other UEs. Depending on how D2D and/or other proximity services are supported, the measurements may be of signals transmitted by other UEs using either a DL (downlink) or UL (uplink) assigned frequency when frequency assignment to an operator is based on FDD (frequency division duplex). Signals from a target UE that may be measured by another UE may include data and signaling to either the network or the UE performing the measurements, broadcast signals (if a UE is allowed to broadcast) and/or temporary signals (e.g. Highly Detectable Pilot (HDP) or Positioning Reference Signal (PRS)) intended to support location measurements. For example, transmission and measurement of these signals may be coordinated or synchronized by the UEs involved or by the network. In some embodiments, new location related or location supporting protocols or enhancements to existing protocols like LPP defined by 3GPP and LPPe defined by the Open Mobile Alliance (OMA) may be developed, for example to support new types of signal measurements.

For locating UEs in a D2D group, an RTT method may be used, for example to enable pairs of UEs to measure round trip signal propagation time (RTT) between the UEs themselves. Once an RTT is obtained between a pair of UEs, the straight line distance between the UEs may be obtained as the value of (c*RTT/2) where c is the signal speed (typically the speed of light). Obtaining the RTTs between pairs of UEs in a D2D group may then be used to determine the relative locations of the UEs. New D2D based procedures may be defined to obtain measurements and improve accuracy. RTT calculation may be performed using a number of schemes and is not limited in scope by the embodiments described below. For instance, the estimated RTT time between two devices may be calculated using one or multiple signals between two devices, by the processors operating on those devices. Furthermore, the RTT may also be calculated, by the processor using assisted time stamps enabled by other entities such as base stations and other devices in the system. In an OTDOA location method, UEs may measure observed timing differences (OTDs) between pairs of other UEs or between a UE and a base station (e.g., an evolved Node B (eNB)) and may use the OTDs to determine relative UE locations. In a distributed GNSS location method, relative UE locations may first be obtained using a method like RTT or OTDOA. Some UEs in the D2D group may then obtain GNSS measurements of SYs. In some embodiments, a total of 7 GNSS measurements from all UEs may be enough to locate each UE in the group given the already known relative UE locations (since, in one such embodiment, only the absolute location and orientation of the group may be unknown after relative UE locations have been obtained). A Highly Detectable Pilot (HDP) method as defined by 3GPP2 for high rate packet data may be used in some embodiments with network permission; such a method may include UEs broadcasting a highly detectable pilot signal in a quasi-synchronized manner. Other UEs may use these HDP signals to measure improved OTDs between pairs of UEs. In a carrier or code phase streaming method, a UE may periodically send GNSS code phase or carrier phase measurements to another UE. The other UE may obtain similar GNSS code phase or carrier phase measurements and derive the first UE's (or its own) relative location using both sets of GNSS measurements.

Exemplary embodiments, for example as described herein, may be used for distributed location support. In some embodiments, a UE may periodically or continuously broadcast to enable location measurements by other UEs (e.g. measurements related to or of RTT, OTD, and signal strength), and further enable discovery of the UE by other UEs and enable dissemination of information about the UE and possibly about other UEs (e.g. identities, locations, location measurements). In some implementations, signaling and information transfer may instead or in addition be restricted to a D2D group and unavailable to UEs outside the group by means of ciphering or time coordinated transmission and reception. The relative or absolute locations of UEs may be periodically updated in all UEs in a D2D group by means of making measurements at each UE of other UEs and transferring the measurements to other UEs in the group allowing each UE to then independently derive the absolute or relative locations of the other UEs. The derived locations may then also be transferred to other UEs allowing some UEs to then derive only a few or even no locations of other UEs. A UE may further transfer its relative change of location (as derived, for example, from sensors or other means) to other UEs to enable other UEs to update their location estimates for that UE.

Existing standard location solutions such as the Secure User Plane Location (SUPL) solution defined by OMA or control plane location solutions defined by 3GPP and 3GPP2 are typically based on client-server models in which either (i) a client UE obtains its location from or with the assistance of a network side location server (not shown) or (ii) a client external to the network obtains the location of a target UE by querying a location server (not shown). In contrast, with a distributed location solution as described in embodiments herein, a UE can take the role of a UE or a location server. In a server role, a UE A may request location measurements from another UE B whose location is desired where the measurements obtained by UE B are of signals transmitted from base stations, WiFi APs, some other UE C or the requesting UE A itself. In a server role, a UE A may provide assistance data to another UE B (e.g. an approximate location of UE B, GNSS or BS timing data, GNSS navigation data) to assist UE B in performing location measurements and possibly computing its own location. In a server role, a UE A may also compute the location of a UE B on behalf of UE B based on measurements made by UE A and/or by UE B. Existing standard positioning protocols and location solutions (e.g. LPP/LPPe, SUPL) may be reused to avoid defining and implementing new positioning protocols and location solutions in some embodiments, but changes to the existing positioning protocols and location solutions may be implemented in other embodiments to support modified authentication and negotiation between UEs of the server/client role. Certain embodiments described herein include distributed location techniques in which 2 or more UEs receive and provide location services (for example, positioning and receipt of assistance data) without the use of a location server.

The distributed location model may be invoked when a client (e.g. e.g. user or application) resident on a UE A requests the location of another UE B. UE A may invoke a distributed location service via D2D signaling if UE B is in the same D2D group as UE A. Location of UEs in a D2D group may already be known (or may be about to become known) with some accuracy if locations are periodically updated via exchange of locations and/or measurements. Hence, additional D2D location invocation may be used to achieve higher accuracy or if location updating periodicity within a D2D group is low. The probability that a request by a UE A for the location of an arbitrary UE B corresponds to a UE in a local D2D group for UE A may be low, but the fact that a D2D group may be established to support communication between the UEs (and by extension the UE users) may result in such a match happening, e.g. if one user wants to meet with another. Distributed location may also be supported in network mode using an application protocol between UEs over the network, but positioning may then not involve UE measurement of other UEs.

For determining when D2D mode versus network mode is suitable and for determining when UEs are in proximity for a particular proximity service, UE-UE distance may be used as a metric. When a pair of UEs are unable to receive (and measure) signals from one another, distance may be obtained by locating each UE separately and calculating the distance. When UEs can receive (and measure) signals from one another, UE-UE distance may be determined from the UE-UE RTT. Example methods for such distance determination for a pair of UEs are listed below and subsequently described in further detail. The examples may apply directly to the LTE radio technology but may be applied to other radio technologies also. The methods are as follows.

A: Measure Tx-Rx of UE-UE signals at each UE.
B: Measure a common serving eNB timing at each UE.
C: Measure timing of the serving eNB at each UE with different but synchronized eNBs.
D: Measure timing of both serving eNBs at each UE with different non-synchronized eNBs.

In some implementations, method A may be used when both UEs can signal to one another (e.g. in D2D mode). Methods B, C, and D may be used when just one UE can signal to the other UE—for example in network mode. Thus, certain of these methods may be used to measure the distance between 2 UEs by either UE when a UE can receive direct signals from the other UE but cannot respond (for example, when communication is effectively one way). Such methods may be used by a pair of UEs to determine when D2D mode may be possible and to trigger associated actions such as attempting to go into D2D mode. Such methods may also be used as part of the discovery of UE proximity to support D2D communication and/or other proximity services. For example, a UE can discover other UEs that support D2D mode or some other proximity service of common interest by receiving direct signals from these other UEs and can also determine the distance to each discovered UE.

Figure 4B:
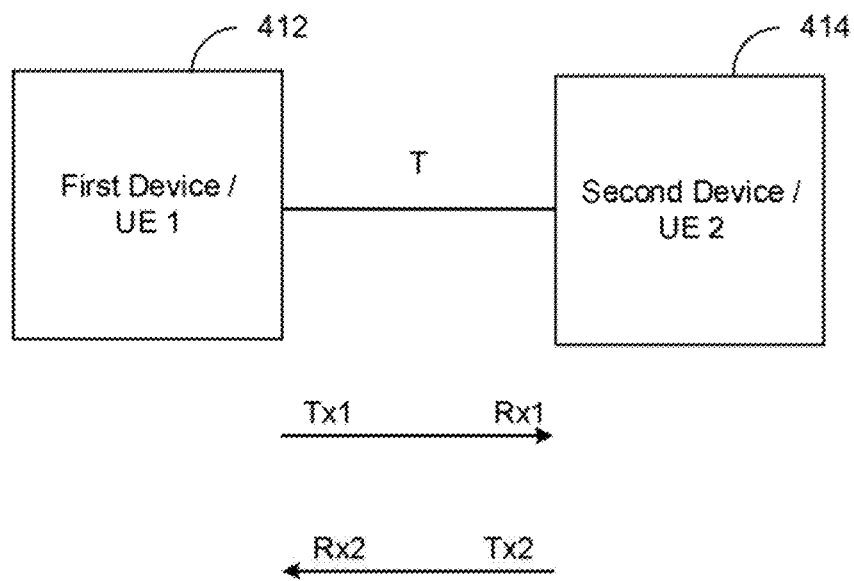
FIG. 4B illustrates an exemplary embodiment for measuring UE-UE round trip time using duplex signaling according to aspects of the present disclosure.

FIG. 4B illustrates an exemplary embodiment for measuring UE-UE round trip time (RTT) using duplex signaling according to aspects of the present disclosure. FIG. 4B describes an embodiment of Method A discussed above. A first device is depicted as user equipment 1 (UE 1) 412 and a second device is depicted as user equipment 2 (UE 2) 414. In FIG. 4B, T is the propagation delay between UE 1 412 and UE 2 414. Signals transmitted by each UE may carry implicit or explicit time information that may be used to measure the transmission and reception times of the signals. For example, the signals may be structured into frames and bits as in GSM or into frames and sub-frames as in LTE. $Tx_1$ is the signal transmission time sent at UE 1 412 and $Tx_2$ is the signal transmission time sent at UE 2 414. $Rx_1$ is the time at UE 2 414 that the signal transmitted by UE 1 412 at $Tx_1$ is received (by UE 2 414) and $Rx_2$ is the time at UE 1 412 that the signal transmitted by UE 2 414 at $Tx_2$ is received (by UE 1 412). In the illustrated embodiment the times $Rx_1$ and $Rx_2$ may be T behind the times $Tx_1$ and $Tx_2$, respectively, at the same absolute point in time due to the propagation time T.

In one implementation, UE 1 412 measures the difference $Tx_1-Rx_2$ between its own signal transmission time $Tx_1$ and the signal transmission time $Rx_2$ received from UE 2 414 and also sends this measurement to UE 2 414 via D2D mode. UE 2 414 measures the difference $Tx_2-Rx_1$ between its own signal transmission time $Tx_2$ and the signal transmission time $Rx_1$ received from UE 1 412 and sends this measurement to UE 1 412 via D2D mode. When both UEs employ the same time units and have equal or nearly equal frequency sources (for example as required by many wireless standards), the measured time differences may remain constant (or nearly constant), regardless of when measured as long as the distance between the UEs remains the same. Thus, $Tx_1$ at UE 1 412 can be assumed to be measured at the same absolute time instant AT as $Tx_2$ at UE 2 414, which means that the time $Rx_2$ received from UE 2 414 by UE 1 412 at time AT may be $Tx_2-T$ and the time $Rx_1$ received from UE 1 412 by UE 2 414 at time AT may be $Tx_1-T$. Therefore, the round trip time can be determined as indicated in the following equation.

$$(Tx_1-Rx_2)+(Tx_2-Rx_1)=(Tx_1-Rx_1)+(Tx_2-Rx_2)=2T=RTT$$

Hence, the pair of time difference measurements may be summed to give the round trip propagation time from which the one way distance can be obtained. This method may also be used by a server node, such as an eNB (e.g. in network mode) to measure the UE-UE RTT if the $(Tx_1-Rx_2)$ measurement at UE 1 412 and the $(Tx_2-Rx_1)$ measurement at UE 2 414 are sent to a common server (e.g. a location server or an eNB) or to different eNBs which later exchange the measurements.

Figure 5A:
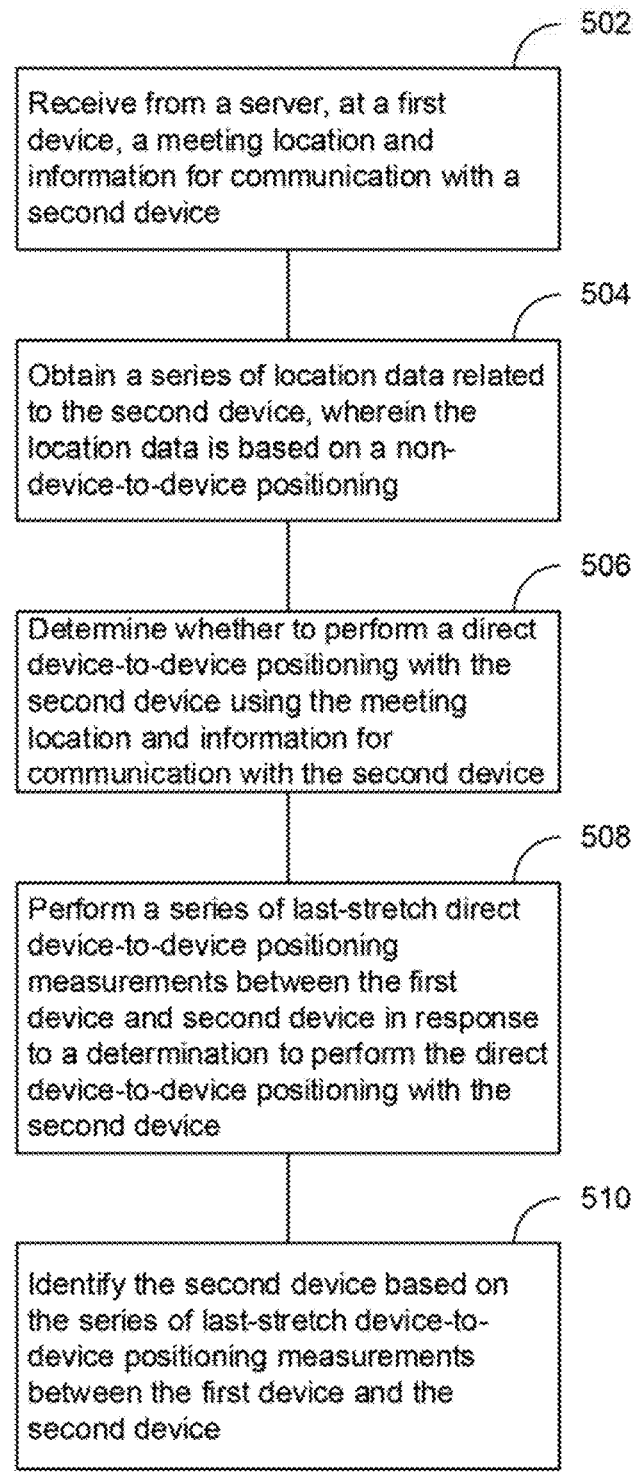
FIG. 5A illustrates an exemplary implementation of peer discovery in a transactional mobile application according to aspects of the present disclosure.

FIG. 5A illustrates an exemplary implementation of peer discovery in a transactional mobile application according to aspects of the present disclosure. In the exemplary implementation shown in FIG. 5A, in block 502, the method receives from a server, at a first device, a meeting location and information for communication with a second device. Means for performing the functionality of block 502 can include, for example, wireless transceiver 721 and/or GPS receiver 755 with reference to FIG. 7. In block 504, the method obtains a series of location data related to the second device, where the location data is based on a non-device-to-device positioning. Means for performing the functionality of block 504 can include, for example, processor(s) 711, and/or DSP(s) 712 with reference to FIG. 7. In block 506, the method determines whether to perform a direct device-to-device positioning with the second device using the meeting location and information for communication with the second device. Means for performing the functionality of block 506 can include, for example, processor(s) 711, and/or DSP(s) 712 with reference to FIG. 7. In block 508, the method performs a series of last-stretch direct device-to-device positioning measurements between the first device and second device in response to a determination to perform the direct device-to-device positioning with the second device. Means for performing the functionality of block 508 can include, for example, processor(s) 711, DSP(s) 712, and/or wireless transceiver 721 with reference to FIG. 7. In block 510, the method identifies the second device based on the series of last-stretch device-to-device positioning measurements between the first device and the second device. Means for performing the functionality of block 510 can include, for example, processor(s) 711, and/or DSP(s) 712 with reference to FIG. 7.

According to aspects of the present disclosure, the first device may include at least one of: a first robot, a first self-driving car, or a first mobile device operated by a first user. Similarly, the second device may include at least one of: a second robot, a second self-driving car, or a second mobile device operated by a second user. The information for communication between the first device and the second device may include at least one of: a pseudo address of the second device assigned by the server, communication capabilities of the second device, a description associated with the second device, an authentication token assigned by the server, or some combinations thereof.

FIG. 5B illustrates an exemplary implementation of determining a threshold range between two mobile devices according to aspects of the present disclosure. As shown in FIG. 5B, in block 522, the method determines a threshold range between the first device and the second device based on the communication capabilities of the first device and the second device. According to aspects of the present disclosure, the communication capabilities of the first device and the second device may include at least one of: LTE direct communication, Wi-Fi direct communication, Bluetooth peer-to-peer communication, or some combinations thereof. The determination to perform the direct device-to-device positioning with the second device is based on the determined threshold range.

FIG. 5C illustrates an exemplary implementation of pairing two mobile devices for peer discovery according to aspects of the present disclosure. In the example shown in FIG. 5C, in block 532, the method pairs the first device and the second device based on interoperability of communication capabilities of the first device and the second device.

Figure 6A:
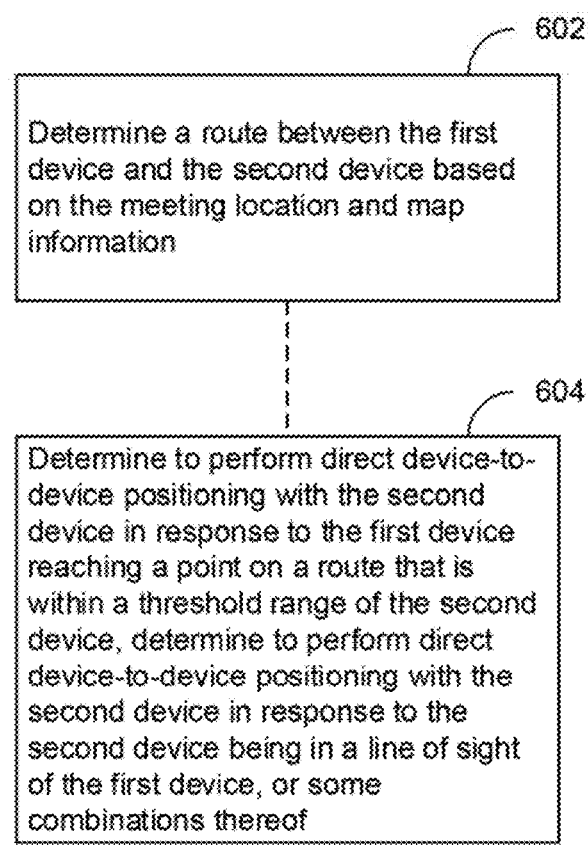
FIG. 6A illustrate an exemplary implementation of determining whether to perform direct ranging between two mobile devices for peer discovery according to aspects of the present disclosure.

FIG. 6A illustrate an exemplary implementation of determining whether to perform direct ranging between two mobile devices for peer discovery according to aspects of the present disclosure. In the exemplary implementation shown in FIG. 6A, in block 602, the method determines a route between the first device and the second device based on the meeting location and map information. In some embodiments, the method performed in block 602 may optionally or additionally include the method performed in block 604. In block 604, the method that determines whether to perform direct device-to-device positioning with the second device further may include at least one of: determine to perform direct device-to-device positioning with the second device in response to the first device reaching a point on a route that is within a threshold range of the second device, determine to perform direct device-to-device positioning with the second device in response to the second device being in a line of sight of the first device, or some combinations thereof.

Figure 6B:
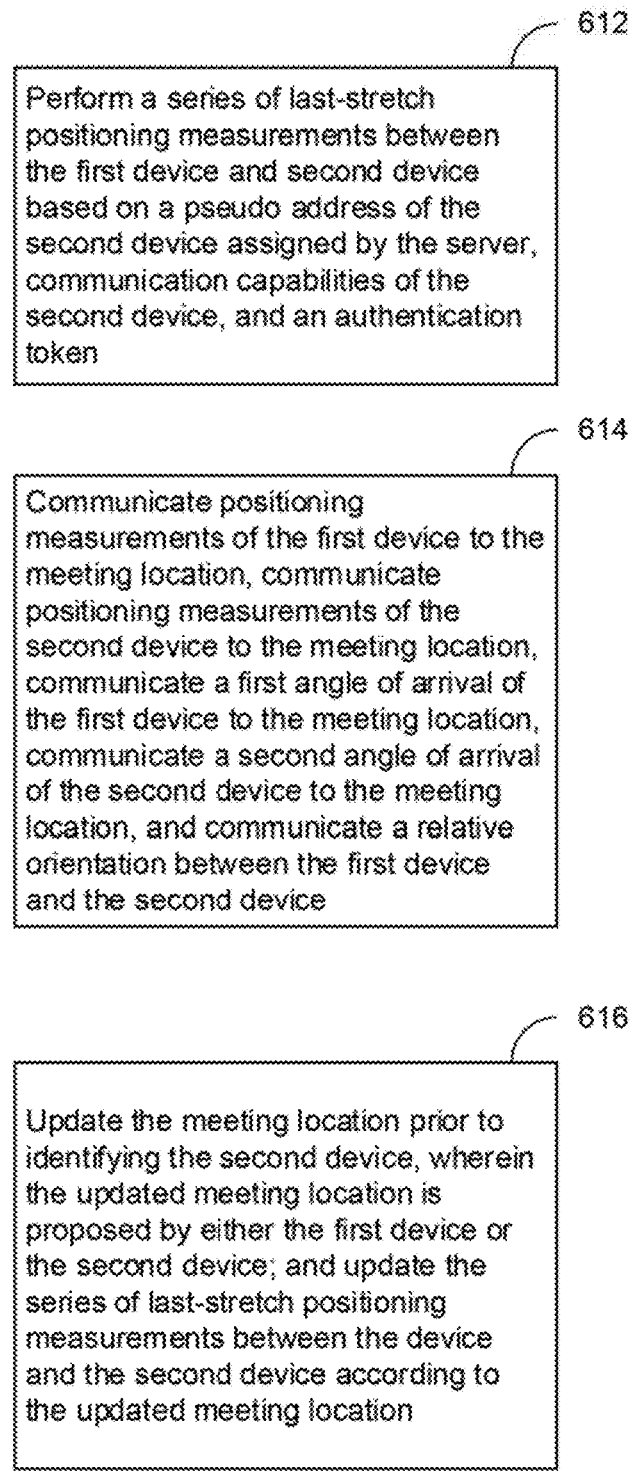
FIG. 6B illustrates exemplary implementations for determining a series of last-stretch positioning measurements between two mobile devices for peer discovery according to aspects of the present disclosure.

FIG. 6B illustrates exemplary implementations for determining a series of last-stretch positioning measurements between two mobile devices for peer discovery according to aspects of the present disclosure. As shown in FIG. 6B, in block 612, the method performs the series of last-stretch positioning measurements between the first device and second device based on a pseudo address of the second device assigned by the server, communication capabilities of the second device, and an authentication token in the information for communication with the second device received from the server.

In block 614, the method for determining the series of last-stretch positioning measurements between the first device and second device include communicate positioning measurements of the first device to the meeting location, communicate positioning measurements of the second device to the meeting location, communicate a first angle of arrival of the first device to the meeting location, communicate a second angle of arrival of the second device to the meeting location, and communicate a relative orientation between the first device and the second device.

In block 616, the method for determining the series of last-stretch positioning measurements between the first device and second device may further include update the meeting location prior to identifying the second device, where the updated meeting location is proposed by either the first device or the second device, and update the series of last-stretch positioning measurements between the first device and the second device according to the updated meeting location.

Figure 6C:
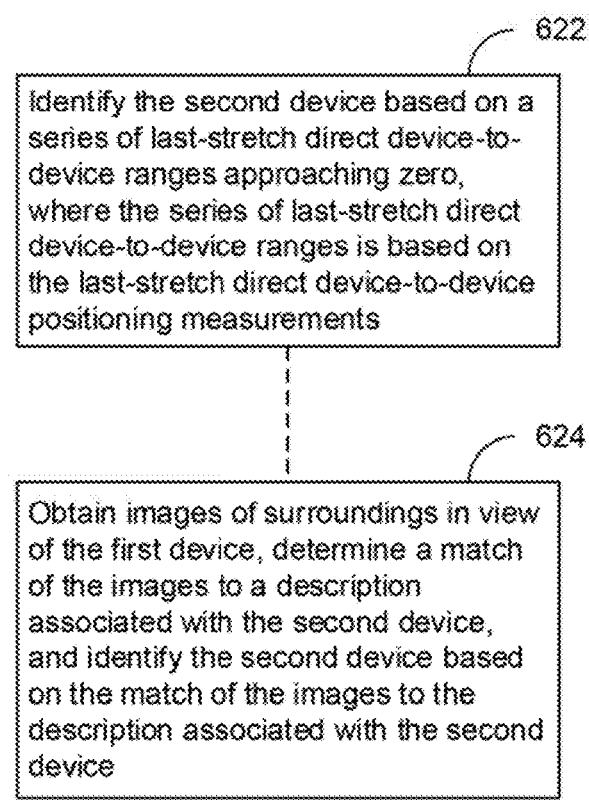
FIG. 6C illustrates an exemplary implementation of identifying a peer mobile device according to aspects of the present disclosure.

FIG. 6C illustrates an exemplary implementation of identifying a peer mobile device according to aspects of the present disclosure. In the example shown in FIG. 6C, in block 622, the method may identify the second device based on the series of last-stretch direct device-to-device ranges approaching zero, where the series of last-stretch direct device-to-device ranges is based on the last-stretch direct device-to-device positioning measurements. According to aspects of the present disclosure, the method performed in block 622 may optionally or additionally include the method performed in block 624. In block 624, the method of identifying the second device may further include obtaining images of surroundings in view of the first device, for example by instructing a camera to capture such images and/or receiving from the camera (such as dedicated camera device 764 of FIG. 7) such images, determine a match of the images to a description associated with the second device, and identify the second device based on the match of the images to the description associated with the second device.

Figure 7:
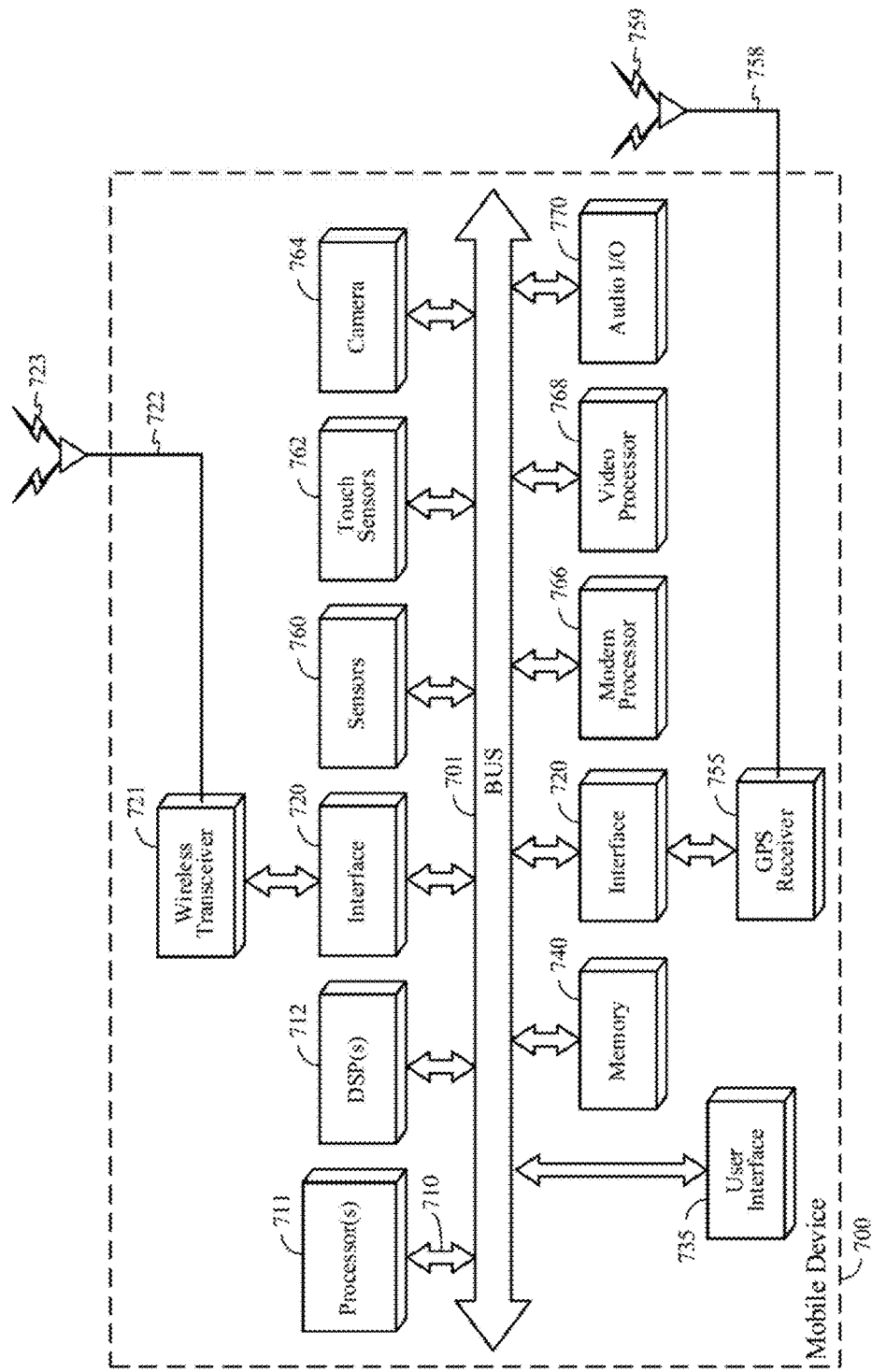
FIG. 7 illustrates an exemplary block diagram of a device that may be configured to discover a peer mobile device in transactional mobile applications according to aspects of the present disclosure.

FIG. 7 illustrates an exemplary block diagram of a device that may be configured to discover a peer mobile device in transactional mobile applications according to aspects of the present disclosure. A device that may be configured to discover a peer mobile device may comprise one or more features of mobile device 700 shown in FIG. 7. In certain embodiments, mobile device 700 may include a wireless transceiver 721 that is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers similar to wireless transceiver 721 and multiple wireless antennas similar to wireless antenna 722 to enable transmitting and/or receiving signals according to a corresponding multiple wireless communication standards such as, for example, versions of Institute of Electrical and Electronics Engineers (IEEE) Std. 802.11, code-division multiple access (CDMA), wideband CDMA (WCDMA), LTE, universal mobile telecommunications service (UMTS), GSM, AMPS, Zigbee and Bluetooth®, etc.

Mobile device 700 may also comprise Global Positioning System (GPS) receiver 755 capable of receiving and acquiring GPS signals 759 via GPS antenna 758. GPS is one example of a GNSS, and it is understood that other satellite positioning systems may also be used. GPS receiver 755 may also process, in whole or in part, acquired GPS signals 759 for estimating a location of a mobile device. In some embodiments, processor(s) 711 (which can include one or more processors executing instructions saved in memory), memory 740, digital signal processor(s) (DSP(s)) 712 and/or specialized processors (not shown) may also be utilized to process acquired GPS signals, in whole or in part, and/or calculate an estimated location of mobile device 700, in conjunction with OPS receiver 755. Storage of GPS or other signals may be performed in memory 740 or registers (not shown).

Also shown in FIG. 7, mobile device 700 may comprise digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. According to aspects of the present disclosure, processor(s) 711 and/or DSP(s) 712 may act as a controller of one or more components within the mobile device 700. In particular, the controller could be coupled to the transceiver 721, as well as coupled to memory 740 (or other suitable memory), which controls the functioning of the transceiver 721. In one embodiment, a controller coupled to the transceiver 721 could comprise a specialized controller of the transceiver acting in coordination with a controller or processor, such as processor(s) 711, outside of the transceiver. In various embodiments, functions may be performed in response execution of one or more machine-readable instructions stored in memory 740 such as on a computer-readable storage medium, such as RAM, ROM, FLASH, or disc drive, just to name a few examples. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless station. Processor(s) 711 and/or DSP(s) 712 may execute instructions to execute one or more aspects of processes/methods discussed in connection with FIG. 1 through FIG. 6, particularly FIGS. 5A, 5B, 5C and FIGS. 6A, 6B, and 6C.

Also shown in FIG. 7, a user interface 735 may comprise any one of several devices such as, for example, a speaker, microphone, display device, vibration device, keyboard, touch screen, etc. A user interface signal provided to a user may be one or more outputs provided by any of the speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or complementary metal-oxide-semiconductor imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DPS(s) or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or GPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Note that at least the following three paragraphs, FIG. 1 through FIG. 7 and their corresponding descriptions provide means for receiving from a server, at the device, a meeting location and information for communication with a second device; means for obtaining a series of location data related to the second device, where the location data is based on a non-device-to-device positioning; means for determining whether to perform a direct device-to-device positioning with the second device using the meeting location and information for communication with the second device; means for performing a series of last-stretch direct device-to-device positioning measurements between the device and the second device in response to a determination to perform the direct device-to-device positioning with the second device; means for identifying the second device based on the series of last-stretch device-to-device positioning measurements between the device and the second device; and means for determining the series of last-stretch positioning measurements between the device and second device based on the pseudo address of the second device assigned by the server, the communication capabilities of the second device, and the authentication token.

The methodologies described herein may be implemented by various means depending upon applications according to particular examples. For example, such methodologies may be implemented in hardware, firmware, and software. In a hardware implementation, for example, a processing unit may be implemented within one or more application specific integrated circuits (ASICs), DSPs, digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a CDMA network, a Time Division Multiple Access (TDMA) network, a Frequency Division Multiple Access (FDMA) network, an Orthogonal FDMA (OFDMA) network, a Single-Carrier FDMA (SC-FDMA) network, or any combination of the above networks, and so on. A CDMA network may implement one or more RATs such as cdma2000, W-CDMA, to name just a few radio technologies. Here, cdma2000 may include technologies implemented according to IS-95, IS-2000, and IS-856 standards. A TDMA network may implement GSM, Digital Advanced Mobile Phone System ("D-AMPS"), or some other radio access technology (RAT). GSM and W-CDMA are described in documents from 3GPP. Cdma2000 is described in documents from 3GPP2. 3GPP and 3GPP2 documents are publicly available. 4G LTE communications networks may also be implemented in accordance with claimed subject matter, in an aspect. A WLAN may comprise an IEEE 802.11x network, and a WPAN may comprise a Bluetooth® network, an IEEE 802.15x, for example Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a CDMA cellular communication protocol, for example, and the femtocell may provide the mobile device access to a larger cellular telecommunication network by way of another broadband network such as the Internet.

Techniques described herein may be used with a GPS that includes any one of several GNSS and/or combinations of GNSS. Furthermore, such techniques may be used with positioning systems that utilize terrestrial transmitters acting as "pseudolites", or a combination of satellite vehicles (SVs) and such terrestrial transmitters. Terrestrial transmitters may, for example, include ground-based transmitters that broadcast a pseudorandom noise (PN) code or other ranging code (e.g., similar to a GPS or CDMA cellular signal). Such a transmitter may be assigned a unique PN code so as to permit identification by a remote receiver. Terrestrial transmitters may be useful, for example, to augment a GPS in situations where GPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "GPS signals" and/or "SV signals", as used herein, is intended to include GPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method of peer discovery, comprising:
    receiving from a server, at a first device, a meeting location and information for communication with a second device;
    obtaining a series of location data related to the second device, wherein the location data is based on a non-device-to-device positioning;
    determining whether to perform a direct device-to-device positioning with the second device using the meeting location and information for communication with the second device;
    performing a series of last-stretch direct device-to-device positioning measurements between the first device and the second device in response to a determination to perform the direct device-to-device positioning with the second device; and
    identifying the second device based on a series of last-stretch direct device-to-device ranges approaching zero, wherein the series of last-stretch direct device-to-device ranges is based on the series of last-stretch device-to-device positioning measurements between the first device and the second device.

2. The method of claim 1, wherein the first device comprises at least one of:
    a first robot;
    a first self-driving car; or
    a first mobile device operated by a first user.

3. The method of claim 2, wherein the second device comprises at least one of:
    a second robot;
    a second self-driving car; or
    a second mobile device operated by a second user.

4. The method of claim 1, wherein the information for communication between the first device and the second device comprises at least one of:
    a pseudo address of the second device assigned by the server;
    communication capabilities of the second device;
    a description associated with the second device;
    an authentication token assigned by the server;
    or some combinations thereof.

5. The method of claim 4, wherein
    the performing the series of last-stretch positioning measurements between the first device and second device comprises performing the series of last-stretch positioning measurements between the first device and second device based on the pseudo address of the second device assigned by the server, the communication capabilities of the second device, and the authentication token.

6. The method of claim 4, wherein the communication capabilities of the first device and the second device comprises at least one of:
    LTE direct communication;
    WiFi direct communication;
    Bluetooth peer-to-peer communication;
    or some combinations thereof.

7. The method of claim 4, further comprising:
    determining a threshold range between the first device and the second device based on the communication capabilities of the first device and the second device, wherein the determination to perform the direct device-to-device positioning with the second device is based on the determined threshold range.

8. The method of claim 4, wherein the first device and the second device are paired based on interoperability of communication capabilities of the first device and the second device.

9. The method of claim 1, wherein determining whether to perform direct device-to-device positioning with the second device comprises:
  determining a route between the first device and the second device based on the meeting location and map information.

10. The method of claim 9, wherein determining whether to perform direct device-to-device positioning with the second device further comprises at least one of:
  performing direct device-to-device positioning with the second device in response to the first device reaching a point on a route that is within a threshold range of the second device;
  performing direct device-to-device positioning with the second device in response to the second device being in a line of sight of the first device;
  or some combinations thereof.

11. The method of claim 1, wherein performing the series of last-stretch positioning measurements between the first device and second device further comprises updating the meeting location prior to identifying the second device, wherein the updated meeting location is proposed by either the first device or the second device.

12. The method of claim 1, wherein the identifying the second device further comprises:
  obtaining images of surroundings in view of the first device;
  determining a match of the images to a description associated with the second device; and
  identifying the second device based on the match of the images to the description associated with the second device.

13. A device, comprising:
  a transceiver configured to:
    receive, from a server, a meeting location and information for communication with a second device;
    obtain a series of location data related to the second device, wherein the location data is based on a non-device-to-device positioning;
  a memory configured to store the meeting location, the information for communication with the second device, and the series of location data related to the second device; and
  a controller coupled to the transceiver and the memory, the controller configured to:
    determine whether to perform a direct device-to-device positioning with the second device using the meeting location and information for communication with the second device;
    compute a series of last-stretch direct device-to-device ranges based on a series of last-stretch direct device-to-device positioning measurements between the device and the second device computed in response to a determination to perform the direct device-to-device positioning with the second device; and
    identify the second device based on the series of last-stretch positioning ranges approaching zero.

14. The device of claim 13, wherein the information for communication between the device and the second device comprises at least one of:
  a pseudo address of the second device assigned by the server;
  communication capabilities of the second device;
  a description associated with the second device;
  an authentication token assigned by the server;
  or some combinations thereof.

15. The device of claim 14, wherein the controller configured to
  compute the series of device-to-device ranges between the device and second device comprises the controller configured to compute the series of last-stretch device-to-device ranges based on the pseudo address of the second device assigned by the server, the communication capabilities of the second device, and the authentication token.

16. The device of claim 14, wherein the communication capabilities of the device and the second device comprises at least one of:
  LTE direct communication;
  WiFi direct communication;
  Bluetooth peer-to-peer communication;
  or some combinations thereof.

17. The device of claim 14, wherein the controller is further configured to:
  determine a threshold range between the device and the second device based on the communication capabilities of the device and the second device, wherein the determination to perform the direct device-to-device positioning with the second device is based on the determined threshold range.

18. The device of claim 14, wherein the device and the second device are paired based on interoperability of communication capabilities of the device and the second device.

19. The device of claim 13, wherein the controller is further configured to:
  determine a route between the device and the second device based on the meeting location and map information.

20. The device of claim 19, wherein the controller is further configured to perform at least one of:
  direct device-to-device positioning with the second device in response to the device reaching a point on a route that is within a threshold range of the second device;
  direct device-to-device positioning with the second device in response to the second device being in a line of sight of the device;
  or some combinations thereof.

21. The device of claim 13, wherein the controller configured to compute the series of last-stretch direct device-to-device ranges further comprises the controller configured to update the meeting location prior to identifying the second device, wherein the updated meeting location is proposed by either the first device or the second device.

22. The device of claim 13, wherein the controller is further configured to:
  obtain images of surroundings in view of the device;
  determine a match of the images to a description associated with the second device; and
  identify the second device based on the match of the images to the description associated with the second device.

23. A non-transitory medium storing instructions for execution by one or more processors of a device, the instructions comprising:
  instructions for processing from a server, at the device, a received meeting location and information for communication with a second device;
  instructions for processing a series of received location data related to the second device, wherein the location data is based on a non-device-to-device positioning;
  instructions for determining whether to perform a direct device-to-device positioning with the second device using the meeting location and information for communication with the second device;
  instructions for performing a series of last-stretch direct device-to-device positioning measurements between the device and the second device in response to a determination to perform the direct device-to-device positioning with the second device; and instructions for identifying the second device based on a series of last-stretch positioning ranges approaching zero, wherein the series of last-stretch direct device-to-device ranges is based on the series of last-stretch device-to-device positioning measurements between the first device and the second device.

24. The non-transitory medium of claim 23, wherein the information for communication between the device and the second device comprises at least one of:
a pseudo address of the second device assigned by the server;
communication capabilities of the second device;
a description associated with the second device;
an authentication token assigned by the server;
or some combinations thereof.

25. The non-transitory medium of claim 24, wherein
the instructions for performing the series of last-stretch positioning measurements between the device and second device comprises instructions for performing the series of last-stretch positioning measurements between the first device and second device based on the pseudo address of the second device assigned by the server, the communication capabilities of the second device, and the authentication token.

26. A device, comprising:
means for receiving from a server, at the device, a meeting location and information for communication with a second device;
means for obtaining a series of location data related to the second device, wherein the location data is based on a non-device-to-device positioning;
means for determining whether to perform a direct device-to-device positioning with the second device using the meeting location and information for communication with the second device;
means for performing a series of last-stretch direct device-to-device positioning measurements between the device and the second device in response to a determination to perform the direct device-to-device positioning with the second device; and
means for identifying the second device based on a series of last-stretch positioning ranges approaching zero, wherein the series of last-stretch direct device-to-device ranges is based on the series of last-stretch device-to-device positioning measurements between the device and the second device.

27. The device of claim 26, wherein the information for communication between the device and the second device comprises at least one of:
a pseudo address of the second device assigned by the server;
communication capabilities of the second device;
a description associated with the second device;
an authentication token assigned by the server;
or some combinations thereof.

28. The device of claim 27, wherein
the means for performing the series of last-stretch positioning measurements between the device and second device comprises performing the series of last-stretch positioning measurements between the first device and second device based on the pseudo address of the second device assigned by the server, the communication capabilities of the second device, and the authentication token.

* * * * *